United States Patent
Moon et al.

(10) Patent No.: US 12,067,365 B2
(45) Date of Patent: Aug. 20, 2024

(54) APPARATUS FOR DETECTING MOMENT DESCRIBED BY SENTENCE QUERY IN VIDEO AND METHOD USING THE SAME

(71) Applicant: ELECTRONICS AND TELECOMMUNICATIONS RESEARCH INSTITUTE, Daejeon (KR)

(72) Inventors: Jin-Young Moon, Daejeon (KR); Jung-Kyoo Shin, Daejeon (KR); Hyung-Il Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 378 days.

(21) Appl. No.: 17/398,554

(22) Filed: Aug. 10, 2021

(65) Prior Publication Data

US 2022/0261550 A1 Aug. 18, 2022

(30) Foreign Application Priority Data

Feb. 15, 2021 (KR) ........................ 10-2021-0019905

(51) Int. Cl.
*G06F 40/30* (2020.01)
*G06F 18/2411* (2023.01)
(Continued)

(52) U.S. Cl.
CPC .......... *G06F 40/30* (2020.01); *G06F 18/2411* (2023.01); *G06F 40/205* (2020.01); *G06V 20/41* (2022.01)

(58) Field of Classification Search
CPC ................. G06F 40/30; G06V 20/41
See application file for complete search history.

(56) References Cited

U.S. PATENT DOCUMENTS 9,535,990 B2  1/2017 Skolicki
2012/0269429 A1 10/2012 Lee et al.
(Continued)

FOREIGN PATENT DOCUMENTS

KR  10-2015-0022088   3/2015
KR  10-2017-0007799   1/2017
KR  10-2019-0129266  11/2019

OTHER PUBLICATIONS

Gyeong-June Hahm, "Joint embedding-based image search technology using natural language processing and image processing", Broadcasting and Media Magazine, Jan. 30, 2021.
(Continued)

*Primary Examiner* — Bryan S Blankenagel
(74) *Attorney, Agent, or Firm* — KILE PARK REED & HOUTTEMAN PLLC (57) ABSTRACT

Disclosed herein are an apparatus for detecting a moment described by a sentence query in a video and a method using the same. A method for detecting a moment described by a sentence query in a video includes dividing an input video into units of chunks and generating a chunk-level feature sequence based on features that are extracted in a form of vectors from respective chunks, dividing an input sentence query into units of words and generating a sentence-level feature sequence based on features that are extracted in a form of vectors from respective words, generating a chunk-sentence relation feature sequence including contextual information of the video by extracting a relation between the chunk-level feature sequence and the sentence-level feature sequence, and estimating a temporal interval corresponding to the sentence query in the video based on the chunk-sentence relation feature sequence.

10 Claims, 9 Drawing Sheets

(51) Int. Cl.
*G06F 40/205* (2020.01)
*G06V 20/40* (2022.01)

(56) References Cited

U.S. PATENT DOCUMENTS

| | | | |
|---|---|---|---|
| 2016/0259978 A1 | 9/2016 | Jeong et al. | |
| 2019/0349641 A1 | 11/2019 | Choi et al. | |
| 2021/0004605 A1* | 1/2021 | Hsiao | G06F 16/7844 |
| 2021/0224601 A1* | 7/2021 | Chen | G06V 20/46 |
| 2021/0289264 A1* | 9/2021 | Booth | G06F 16/735 |
| 2021/0349940 A1* | 11/2021 | Chen | G06V 10/761 |
| 2022/0147565 A1* | 5/2022 | Chalasani | G06N 3/08 |

OTHER PUBLICATIONS

Gyeong-June Hahm et. al., "Learning a Video-Text Joint Embedding using Korean Tagged Movie Clips", 2020 International Conference on Information and Communication Technolog Convergence (ICTC), Oct. 21, 2020.

* cited by examiner

APPARATUS FOR DETECTING MOMENT DESCRIBED BY SENTENCE QUERY IN VIDEO AND METHOD USING THE SAME

CROSS REFERENCE TO RELATED APPLICATION

This application claims the benefit of Korean Patent Application No. 10-2021-0019905, filed Feb. 15, 2021, which is hereby incorporated by reference in its entirety into this application.

BACKGROUND OF THE INVENTION

1. Technical Field

The present invention relates generally to technology for detecting the moment described by a sentence query in a video, and more particularly to technology for understanding both visual and semantic information from a video and a sentence query and detecting the temporal interval of the moment best matching the sentence query within the video.

2. Description of the Related Art

Most methods for understanding actions contained in a video detect the temporal interval of predefined actions consisting of start and end times in the video. However, videos in the real world contain various actions and objects, which are based on interaction with each other, and thus complicated meanings are contained therein. Therefore, there is a limitation on learning a wide variety of complicated content using predefined action categories.

That is, in order to accurately understand videos in the real word, a method that is capable of retrieving the video moment described by sentence queries indicating various and complicated meanings is required, and thus technology for retrieving the moment that best matches its sentence from the video is also required.

PRIOR ART DOCUMENTS

Patent Documents (Patent Document 1) Korean Patent Application Publication No. 10-2017-0007799, Date of Publication: Jan. 20, 2017 (Title: Systems and Methods for Generating Video Program Extracts Based on Search Queries)

SUMMARY OF THE INVENTION

Accordingly, the present invention has been made keeping in mind the above problems occurring in the prior art, and an object of the present invention is to understand the content of a video and a sentence query and retrieve the moment that best matches the meaning contained in the sentence query from the video.

Another object of the present invention is to understand a video from the semantic aspect of a sentence query and present a relation extraction module for emphasizing only visual information related to the sentence query.

A further object of the present invention is to calculate proposal probabilities for combinations of all temporal intervals that can be generated in a video and acquire the temporal interval having the highest proposal probability, among the proposal probabilities, as a temporal interval in which the contents of the video and the sentence query best match each other.

Yet another object of the present invention is to independently extract respective features of a video and a sentence query and detect more diverse and more complicated actions using a scheme for understanding contextual information of the video in association with the sentence query.

Still another object of the present invention is to learn not only static information of a video, that is, pieces of appearance information that can be independently acquired at each moment, but also dynamic information, thus searching for a complicated action such as an action subsequent to or previous to a specific action.

In accordance with an aspect of the present invention to accomplish the above objects, there is provided a method for detecting a moment described by a sentence query in a video, including dividing an input video into units of chunks and generating a chunk-level feature sequence based on features that are extracted in a form of vectors from respective chunks; dividing an input sentence query into units of words and generating a sentence-level feature sequence based on features that are extracted in a form of vectors from respective words; generating a chunk-sentence relation feature sequence including contextual information of the video by extracting a relation between the chunk-level feature sequence and the sentence-level feature sequence; and estimating a temporal interval corresponding to the sentence query in the video based on the chunk-sentence relation feature sequence.

Generating the chunk-sentence relation feature sequence may include extracting pieces of target feature information related to the sentence-level feature sequence for respective time points from the chunk-level feature sequence; and sequentially combining the pieces of target feature information with each other depending on the time points, thus extracting overall contextual information of the video.

Estimating the temporal interval may be configured to estimate a temporal interval corresponding to target contextual information related to the sentence-level feature sequence, among all temporal intervals of the video, to be the interval corresponding to the sentence query based on the overall contextual information of the video.

Estimating the temporal interval may be configured to generate a proposal probability map related to the target contextual information for all temporal intervals of the video and to detect a temporal interval having a highest probability in the proposal probability map as the temporal interval corresponding to the target contextual information.

Generating the chunk-level feature sequence may be configured to extract RGB frames or flow frames corresponding to respective chunks from the video and to sequentially extract video features from respective chunks based on the RGB frames or flow frames, thus generating the chunk-level feature sequence.

Generating the sentence-level feature sequence may be configured to generate a sentence-level feature sequence corresponding to semantics of the sentence query by sequentially inputting word vectors extracted from respective words to a recurrent neural network.

The proposal probability map may be generated based on a global value extraction scheme or a local value extraction scheme.

In accordance with another aspect of the present invention to accomplish the above objects, there is provided an apparatus for detecting a moment described by a sentence query in a video, including a processor for dividing an input video into units of chunks, generating a chunk-level feature sequence based on features that are extracted in a form of vectors from respective chunks, dividing an input sentence query into units of words, generating a sentence-level feature sequence based on features that are extracted in a form of vectors from respective words, generating a chunk-sentence relation feature sequence including contextual information of the video by extracting a relation between the chunk-level feature sequence and the sentence-level feature sequence, and estimating a temporal interval corresponding to the sentence query in the video based on the chunk-sentence relation feature sequence; and memory for storing the video and the sentence query.

The processor may extract pieces of target feature information related to the sentence-level feature sequence for respective time points from the chunk-level feature sequence, and may sequentially combine the pieces of target feature information with each other depending on the time points, thus extracting overall contextual information of the video.

The processor may estimate a temporal interval corresponding to target contextual information related to the sentence-level feature sequence, among all temporal intervals of the video, to be the temporal interval corresponding to the sentence query based on the overall contextual information of the video.

The processor may generate a proposal probability map related to the target contextual information for all temporal intervals of the video and detect a temporal interval having a highest probability in the proposal probability map as the temporal interval corresponding to the target contextual information.

The processor may extract RGB frames or flow frames corresponding to respective chunks from the video and sequentially extract video features from respective chunks based on the RGB frames or flow frames, thus generating the chunk-level feature sequence.

The processor may generate a sentence-level feature sequence corresponding to semantics of the sentence query by sequentially inputting word vectors extracted from respective words to a recurrent neural network.

The proposal probability map may be generated based on a global value extraction scheme or a local value extraction scheme.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
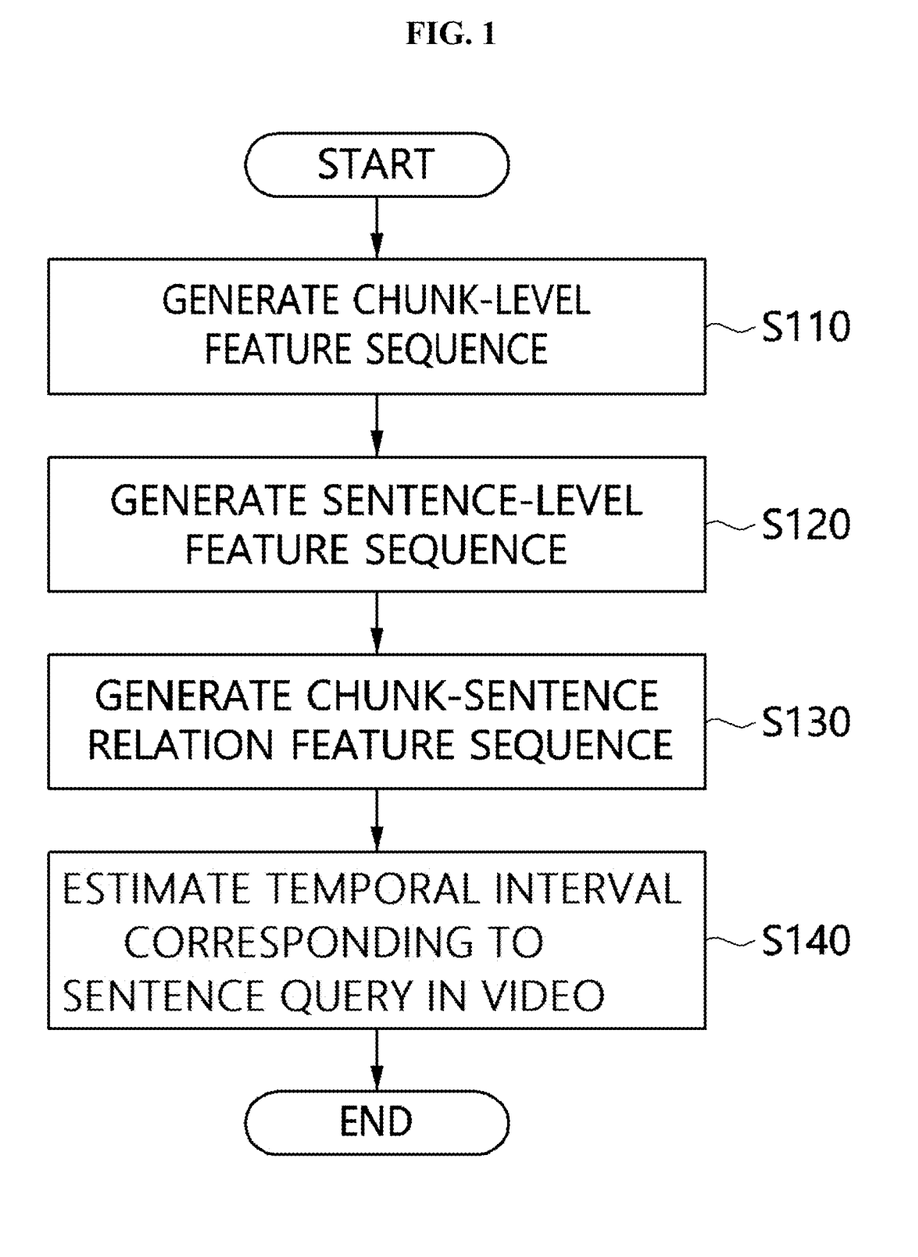
FIG. 1 is an operation flowchart illustrating a method for detecting the moment described by a sentence query in a video according to an embodiment of the present invention.

FIG. 1 is an operation flowchart illustrating a method for detecting the moment described by a sentence query in a video according to an embodiment of the present invention.

Referring to FIG. 1, the method for detecting the moment described by a sentence query in a video according to the embodiment of the present invention divides an input video into units of chunks and generates a chunk-level feature sequence based on features extracted in the form of vectors from respective chunks at step S110.

Figure 2:
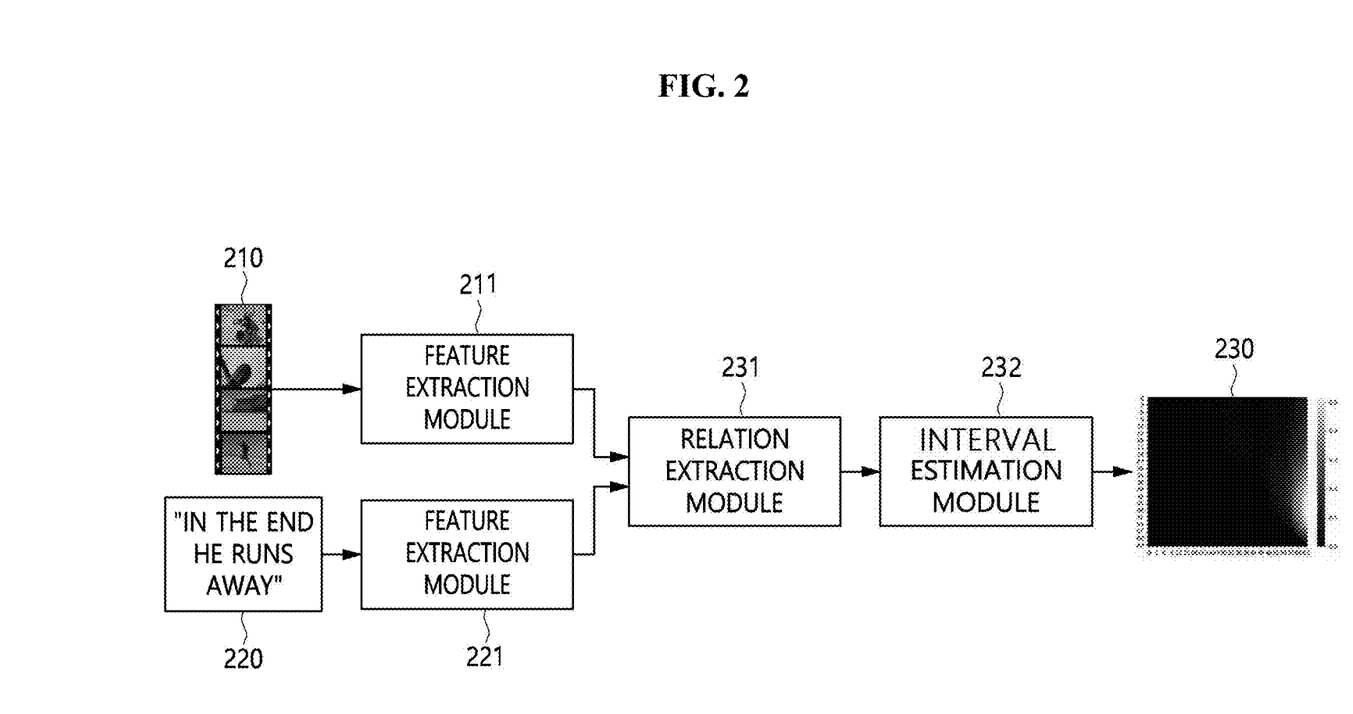
FIG. 2 is a diagram illustrating an example of a process for detecting the moment described by a sentence query in a video according to the present invention.

For example, referring to a process for detecting the moment described by a sentence query in a video, illustrated in FIG. 2, an input video 210 may be applied to a separate feature extraction module 211, and thus a chunk-level feature sequence may be generated.

Here, RGB frames or flow frames corresponding to respective chunks may be extracted from the video, and video features may be sequentially extracted from respective chunks based on the RGB frames or flow frames, and thus the chunk-level feature sequence may be generated.

Figure 3:
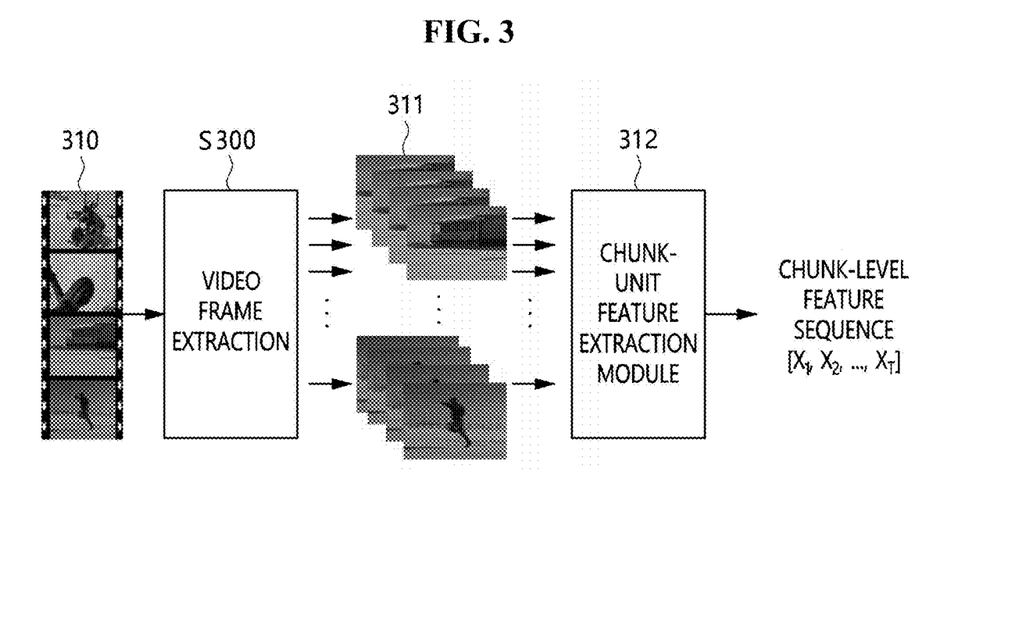
FIG. 3 is a diagram illustrating an example of a process for generating a chunk-level feature sequence according to the present invention.

For example, referring to FIG. 3, the sequence of an input video 310 may be divided into multiple chunks 311 by grouping the sequence into a certain number of frames or by sampling the sequence. Here, the video may be divided into fragments, each having a certain length, and thus the multiple chunks 311 may be generated.

Therefore, RGB frames or flow frames corresponding to the chunks 311, generated as illustrated in FIG. 3, may be extracted from the video at step S300, and the respective chunks 311 may be sequentially input to a chunk-unit feature extraction module 312, such as that illustrated in FIG. 3, and thus a chunk-level feature sequence may be generated.

Further, the method for detecting the moment described by a sentence query in a video according to the embodiment of the present invention divides an input sentence query into units of words and generates a sentence-level feature sequence based on features extracted in the form of vectors from respective words at step S120.

For example, referring to the process for detecting the moment described by a sentence query in a video, illustrated in FIG. 2, an input sentence query 220 may be applied to a separate feature extraction module 221, and thus the sentence-level feature sequence may be generated.

In this case, word vectors extracted from respective words may be sequentially input to a recurrent neural network, so that the sentence-level feature sequence corresponding to the semantics of the sentence query may be generated.

Figure 4:
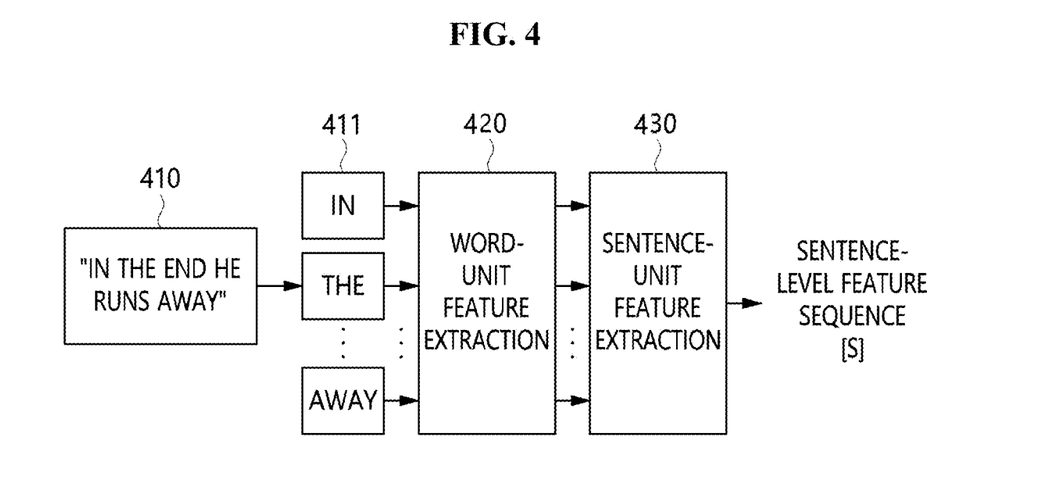
FIG. 4 is a diagram illustrating an example of a process for generating a sentence-level feature sequence according to the present invention.

For example, referring to FIG. 4, a sentence query 410 may be divided into multiple words 411 constituting the sentence. Thereafter, respective words 411 may be input to a word-unit feature extraction module 420, such as that illustrated in FIG. 4, so that word vectors corresponding to word-unit vector features may be extracted, and the word vectors extracted from respective words may be sequentially input to the recurrent neural network, and thus a sentence-level feature sequence indicating the features of vector forms related to the semantics of the sentence query 410 may be generated.

Next, the method for detecting the moment described by a sentence query in a video according to the embodiment of the present invention generates a chunk-sentence relation feature sequence (or a chunk-sentence relation-based feature sequence) including contextual information of the video by extracting the relation between the chunk-level feature sequence and the sentence-level feature sequence at step S130.

In this case, pieces of target feature information related to the sentence-level feature sequence may be extracted for respective time points from the chunk-level feature sequence.

Here, the pieces of target feature information may be sequentially combined with each other depending on the time points, and thus the overall contextual information of the video may be extracted.

Figure 5:
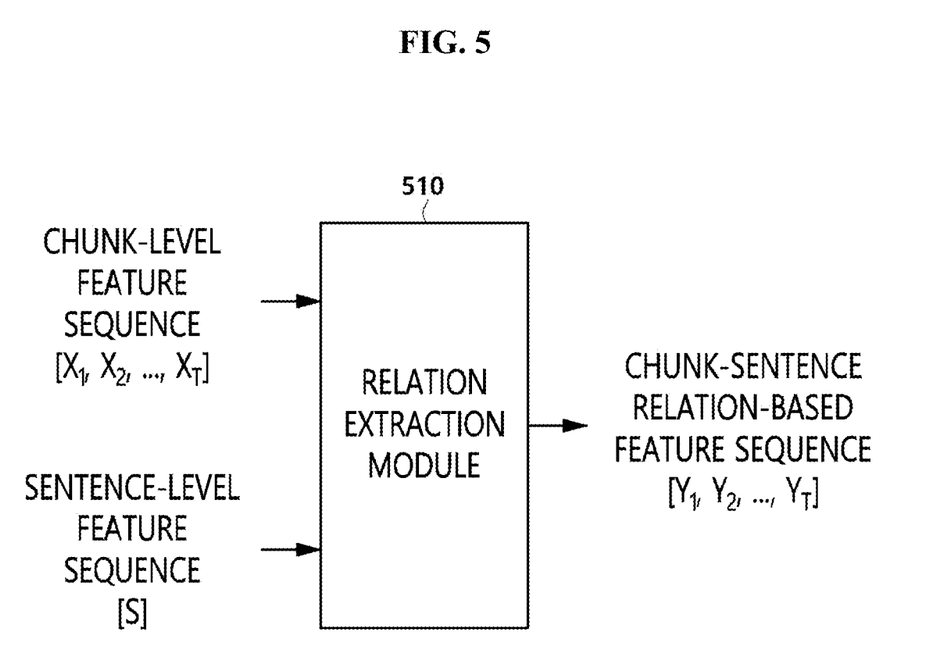
FIG. 5 is a diagram illustrating an example of a process for generating a chunk-sentence relation feature sequence according to the present invention.

For example, referring to FIG. 5, the chunk-level feature sequence generated based on the video, together with the sentence-level feature sequence generated based on the sentence query, may be sequentially input to a relation extraction module 510. In this case, the relation extraction module 510 illustrated in FIG. 5 may emphasize only information related to the sentence query, among respective chunks of the video, and may extract the contextual information of the video by combining information extracted from a previously input chunk with information extracted from a currently input chunk.

Hereinafter, the operation of the relation extraction module 510 illustrated in FIG. 5 will be described in detail with reference to FIG. 6.

Generally, in most cases, there is not a one-to-one correspondence relationship between each chunk of the video and a sentence query. That is, a specific chunk may contain only a portion of the sentence query, and may also contain information irrelevant to the sentence query.

Figure 6:
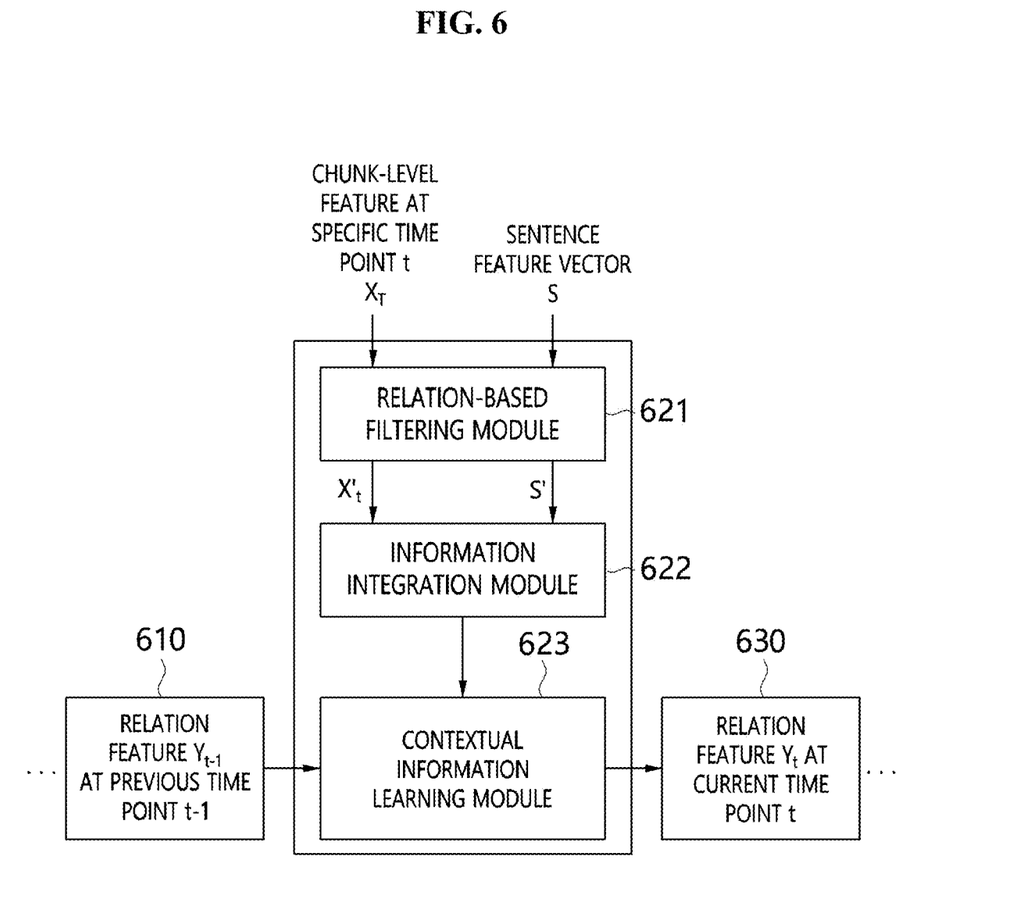
FIG. 6 is a diagram illustrating an example of a relation extraction module according to the present invention.

Therefore, the relation extraction module according to the embodiment of the present invention may filter only pieces of mutually associated information based on a relation-based filtering module 621, as illustrated in FIG. 6.

In this case, through interaction between chunk-level features and sentence feature vectors corresponding to sentence-level features at respective time points, only pieces of information associated with each other may be filtered.

Thereafter, the relation extraction module may integrate two pieces of information that have been filtered and emphasized using an information integration module 622, and may acquire only contextual information related to sentence features, among pieces of contextual information of multiple chunks, by combining the integrated information with information generated at the previous time point.

This process is performed on the overall sequence of chunks divided from the video, and thus a chunk-sentence relation feature sequence may be generated.

Next, the method for detecting the moment described by a sentence query in a video according to the embodiment of the present invention estimates a temporal interval corresponding to the sentence query from the video based on the chunk-sentence relation feature sequence at step S140.

Here, based on the overall contextual information of the video, a temporal interval corresponding to target contextual information related to the sentence-level feature sequence, among all temporal intervals of the video, may be estimated to be the temporal interval corresponding to the sentence query.

Here, the present invention may estimate the temporal interval most suitable for the content of the sentence query, among all temporal intervals of the video, by inputting the chunk-sentence relation feature sequence to a separate temporal interval estimation module.

Here, for all temporal intervals of the video, a proposal probability map related to target contextual information may be generated, and the temporal interval having the highest probability in the proposal probability map may be detected as a temporal interval corresponding to the target contextual information.

Here, the proposal probability map may be a map indicating proposal probabilities that all temporal intervals of the video will match respective natural language characters. For example, referring to FIG. 8, in a proposal probability map 830, the Y axis of each point may correspond to the start point of the corresponding temporal interval, and the X axis of each point may correspond to the end point of the temporal interval.

Figure 7:
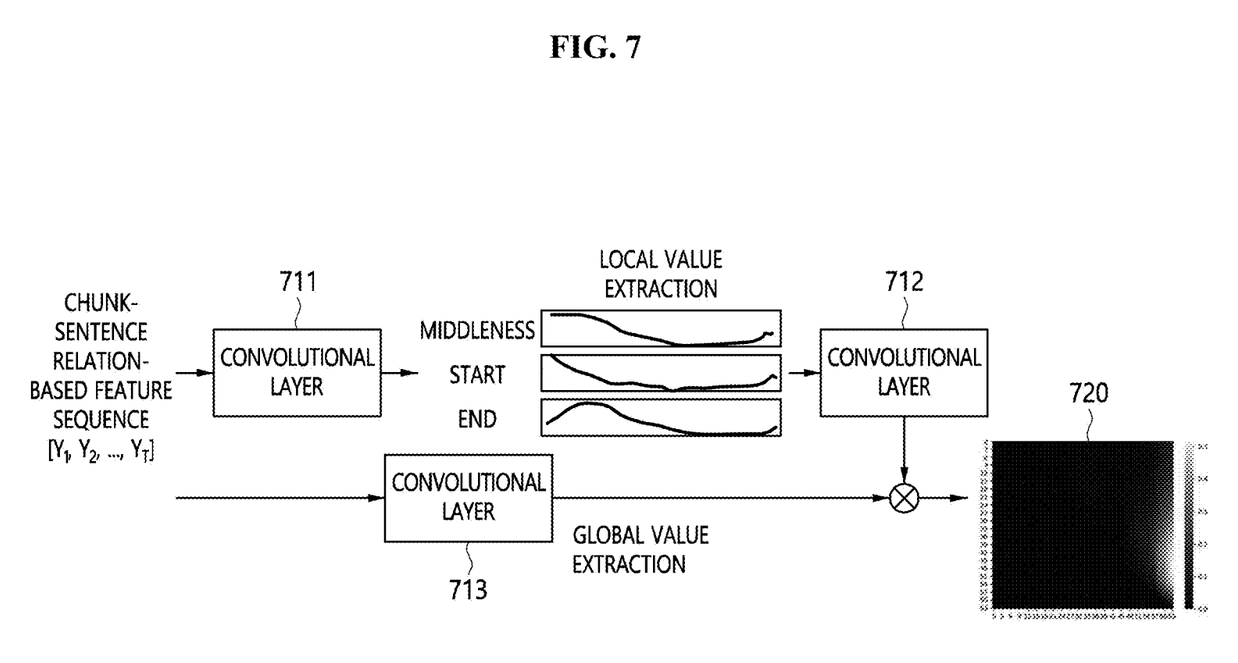
FIG. 7 is a diagram illustrating an example of a process for estimating a temporal interval corresponding to a sentence query according to the present invention.

Referring to FIG. 7, a proposal probability map 720 according to an embodiment of the present invention may be generated based on a global value extraction scheme or a local value extraction scheme.

For example, a value obtained by combining local values extracted based on the local value extraction scheme through a convolutional layer 712 may be combined with the global value extracted based on the global value extraction scheme, whereby the proposal probability map 720 may be generated.

Here, the local value extraction scheme may be a scheme for independently calculating probabilities that, for respective chunks, the corresponding chunk will be the start point, end point, and middle point of the temporal interval corresponding to the sentence query, and for generating the proposal probability map based on the calculated probabilities.

For example, as illustrated in FIG. 7, local values for respective chunks may be extracted by inputting the chunk-sentence relation feature sequence to a convolutional layer 711.

The global value extraction scheme may correspond to a scheme for generating the proposal probability map by directly exploiting feature sequences for the entire video.

For example, as illustrated in FIG. 7, the global value may be extracted by inputting the chunk-sentence relation feature sequence for the entire video to a convolutional layer 713.

In the proposal probability map 720 generated in this way, information corresponding to the highest probability value may be detected, and a temporal interval corresponding to the detected information may be estimated to be the temporal interval corresponding to the sentence query.

Figure 8:
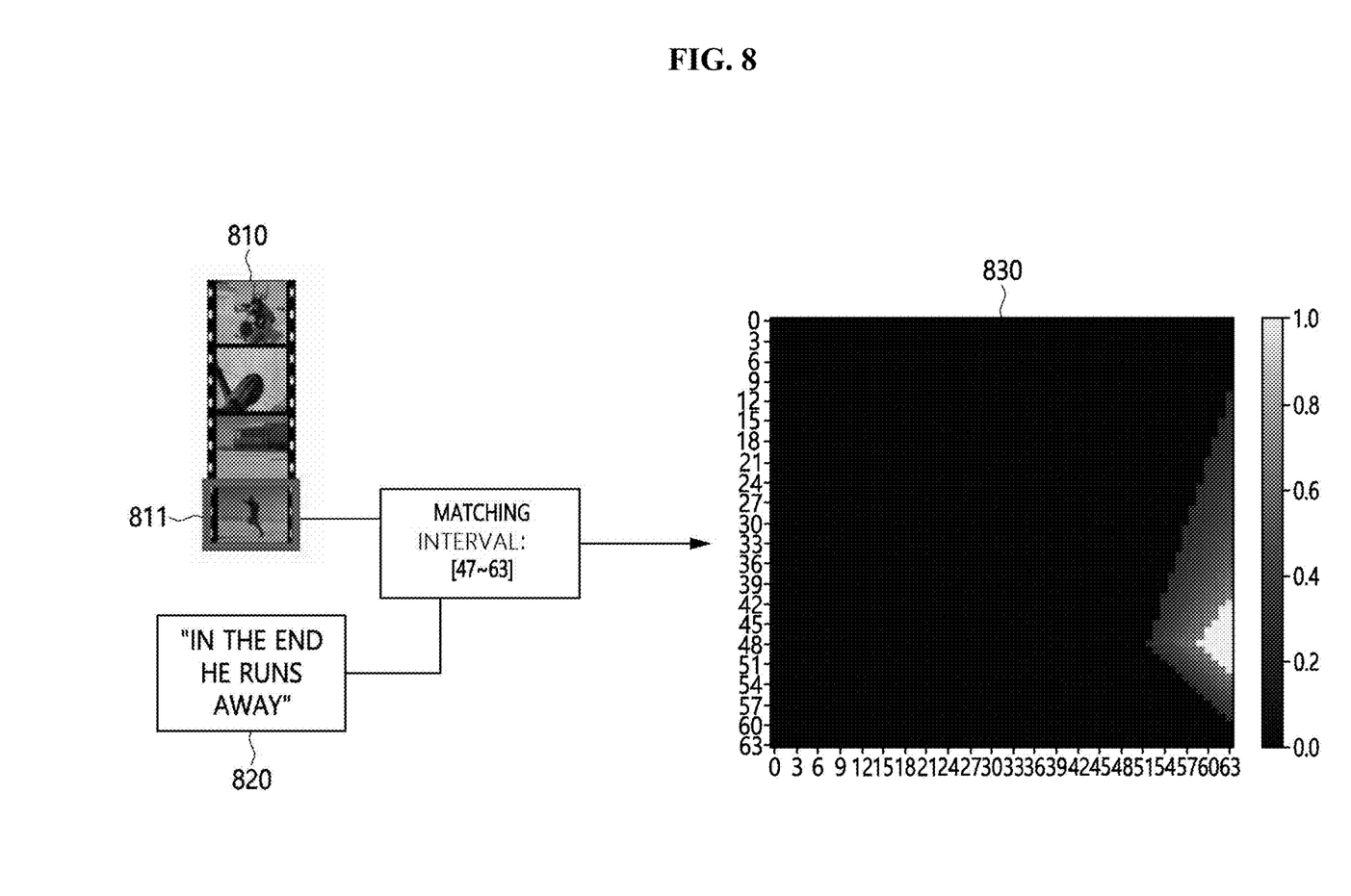
FIG. 8 is a diagram illustrating an example of a ground truth for predicting a proposal probability map according to the present invention.

In this case, FIG. 8 illustrates a process for configuring learning samples for supervised learning in a neural network model for performing a method for detecting the moment described by a sentence query in a video presented by the present invention, and shows an example of ground truth for predicting a proposal probability map.

In this case, when, in a video 810, an Intersection over Union (IoU) value between a ground-truth matching temporal interval 811 that matches a sentence query 820 and each estimated temporal interval of a proposal probability map 830 is greater than 0.7, a sample value for the corresponding temporal interval may be set to '1'. Further, when the IoU value is less than or equal to 0.3, the sample value may be set to '0'. Further, for the remaining temporal intervals, in which the IoU value is less than or equal to 0.7 and is greater than 0.3, the IoU values may be used as sample values for the corresponding temporal intervals without change.

By means of such a method for detecting the moment described by a sentence query in a video, the content of a video and a sentence query may be understood, and the temporal interval of the moment that best matches the meaning contained in the sentence query may be retrieved from the video.

Further, a video may be understood from the semantic aspect of a sentence query, and a relation extraction module for emphasizing only visual information related to the sentence query may be presented.

Furthermore, proposal probabilities may be calculated for combinations of all temporal intervals that can be generated in a video and the temporal interval having the highest proposal probability, among the proposal probabilities, may be acquired as a temporal interval in which the contents of the video and the sentence query best match each other.

Furthermore, respective features of a video and a sentence query may be independently extracted, and more diverse and more complicated actions may be detected using a scheme for understanding contextual information of the video in association with the sentence query.

In addition, not only static information of a video, that is, pieces of appearance information that can be independently acquired at each moment, but also dynamic information may be learned, and thus a complicated action such as an action subsequent to or previous to a specific action may be searched for.

Figure 9:
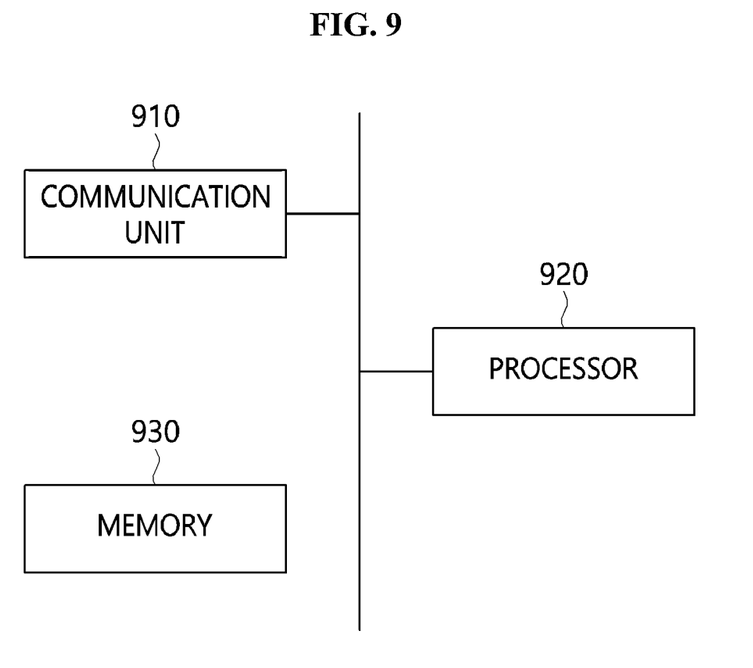
FIG. 9 is a block diagram illustrating an apparatus for detecting the moment described by a sentence query in a video according to an embodiment of the present invention.

FIG. 9 is a block diagram illustrating an apparatus for detecting the moment described by a sentence query in a video according to an embodiment of the present invention.

Referring to FIG. 9, the apparatus for detecting the moment described by a sentence query in a video according to the embodiment of the present invention includes a communication unit 910, a processor 920, and memory 930.

The communication unit 910 may function to transmit and receive information required for the detection of the moment described by a sentence query in a video through a communication network such as a typical network. Here, the network provides a path through which data is delivered between devices, and may be conceptually understood to encompass networks that are currently being used and networks that have yet to be developed.

For example, the network may be an IP network, which provides service for transmission and reception of a large amount of data and seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a High-Speed Downlink Packet Access (HSDPA) network, a 3.5G mobile communication network including a Long Term Evolution (LTE) network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 920 divides an input video into units of chunks and generates a chunk-level feature sequence based on features extracted in the form of vectors from respective chunks.

For example, referring to a process for detecting the moment described by a sentence query in a video, illustrated in FIG. 2, an input video 210 may be applied to a separate feature extraction module 211, and thus a chunk-level feature sequence may be generated.

Here, RGB frames or flow frames corresponding to respective chunks may be extracted from the video, and video features may be sequentially extracted from respective chunks based on the RGB frames or flow frames, and thus the chunk-level feature sequence may be generated.

For example, referring to FIG. 3, the sequence of an input video 310 may be divided into multiple chunks 311 by grouping the sequence into a certain number of frames or by sampling the sequence. Here, the video may be divided into fragments, each having a certain length, and thus the multiple chunks 311 may be generated.

Therefore, RGB frames or flow frames corresponding to the chunks 311, generated as illustrated in FIG. 3, may be extracted from the video at step S300, and the respective chunks 311 may be sequentially input to a chunk-unit feature extraction module 312, such as that illustrated in FIG. 3, and thus a chunk-level feature sequence may be generated.

Further, the processor 920 divides an input sentence query into units of words and generates a sentence-level feature sequence based on features extracted in the form of vectors from respective words.

For example, referring to the process for detecting the moment described by a sentence query in a video, illustrated in FIG. 2, an input sentence query 220 may be applied to a separate feature extraction module 221, and thus the sentence-level feature sequence may be generated.

In this case, word vectors extracted from respective words may be sequentially input to a recurrent neural network, so that the sentence-level feature sequence corresponding to the semantics of the sentence query may be generated.

For example, referring to FIG. 4, a sentence query 410 may be divided into multiple words 411 constituting the sentence. Thereafter, respective words 411 may be input to a word-unit feature extraction module 420, such as that illustrated in FIG. 4, so that word vectors corresponding to word-unit vector features may be extracted, and the word vectors extracted from respective words may be sequentially input to the recurrent neural network, and thus a sentence-level feature sequence indicating the features of vector forms related to the semantics of the sentence query 410 may be generated.

Furthermore, the processor 920 generates a chunk-sentence relation feature sequence (or a chunk-sentence relation-based feature sequence) including contextual information of the video by extracting the relation between the chunk-level feature sequence and the sentence-level feature sequence.

In this case, pieces of target feature information related to the sentence-level feature sequence may be extracted for respective time points from the chunk-level feature sequence.

Here, the pieces of target feature information may be sequentially combined with each other depending on the time points, and thus the overall contextual information of the video may be extracted.

For example, referring to FIG. 5, the chunk-level feature sequence generated based on the video, together with the sentence-level feature sequence generated based on the sentence query, may be sequentially input to a relation extraction module 510. In this case, the relation extraction module 510 illustrated in FIG. 5 may emphasize only information related to the sentence query, among respective chunks of the video, and may extract the contextual information of the video by combining information extracted from a previously input chunk with information extracted from a currently input chunk.

Hereinafter, the operation of the relation extraction module illustrated in FIG. 5 will be described in detail with reference to FIG. 6.

Generally, in most cases, there is not a one-to-one correspondence relationship between each chunk of the video and a sentence query. That is, a specific chunk may contain only a portion of the sentence query, and may also contain information irrelevant to the sentence query.

Therefore, the relation extraction module according to the embodiment of the present invention may filter only pieces of mutually associated information based on a relation-based filtering module 621, as illustrated in FIG. 6.

In this case, through interaction between chunk-level features and sentence feature vectors corresponding to sentence-level features at respective time points, only pieces of information associated with each other may be filtered.

Thereafter, the relation extraction module may integrate two pieces of information that have been filtered and emphasized using an information integration module 622, and may acquire only contextual information related to sentence features, among pieces of contextual information of multiple chunks, by combining the integrated information with information generated at the previous time point.

This process is performed on the overall sequence of chunks divided from the video, and thus a chunk-sentence relation feature sequence may be generated.

Furthermore, the processor 920 estimates a temporal interval corresponding to the sentence query from the video based on the chunk-sentence relation feature sequence.

Here, based on the overall contextual information of the video, a temporal interval corresponding to target contextual information related to the sentence-level feature sequence, among all temporal intervals of the video, may be estimated to be the temporal interval corresponding to the sentence query.

Here, the present invention may estimate the temporal interval most suitable for the content of the sentence query, among all temporal intervals of the video, by inputting the chunk-sentence relation feature sequence to a separate temporal interval estimation module.

Here, for all temporal intervals of the video, a proposal probability map related to target contextual information may be generated, and the temporal interval having the highest probability in the proposal probability map may be detected as a temporal interval corresponding to the target contextual information.

Here, the proposal probability map may be a map indicating proposal probabilities that all temporal intervals of the video will match respective natural language characters. For example, referring to FIG. 8, in a proposal probability map 830, the Y axis of each point may correspond to the start point of the corresponding temporal interval, and the X axis of each point may correspond to the end point of the temporal interval.

Referring to FIG. 7, a proposal probability map 720 according to an embodiment of the present invention may be generated based on a global value extraction scheme or a local value extraction scheme.

For example, a value obtained by combining local values extracted based on the local value extraction scheme through a convolutional layer 712 may be combined with the global value extracted based on the global value extraction scheme, whereby the proposal probability map 720 may be generated.

Here, the local value extraction scheme may be a scheme for independently calculating probabilities that, for respective chunks, the corresponding chunk will be the start point, end point, and middle point of the temporal interval corresponding to the sentence query, and for generating the proposal probability map based on the calculated probabilities.

For example, as illustrated in FIG. 7, local values for respective chunks may be extracted by inputting the chunk-sentence relation feature sequence to a convolutional layer 711.

The global value extraction scheme may correspond to a scheme for generating the proposal probability map by directly exploiting feature sequences for the entire video.

For example, as illustrated in FIG. 7, the global value may be extracted by inputting the chunk-sentence relation feature sequence for the entire video to a convolutional layer 713.

In the proposal probability map 720 generated in this way, information corresponding to the highest probability value may be detected, and a temporal interval corresponding to the detected information may be estimated to be the temporal interval corresponding to the sentence query.

In this case, FIG. 8 illustrates a process for configuring learning samples for supervised learning in a neural network model for performing a method for detecting the moment described by a sentence query in a video presented by the present invention, and shows an example of ground truth for predicting a proposal probability map.

In this case, in a video 810, when an Intersection over Union (IoU) value between a ground-truth matching temporal interval 811 that matches a sentence query 820 and each estimated temporal interval of a proposal probability map 830 is greater than 0.7, a sample value for the corresponding temporal interval may be set to '1'. Further, when the IoU value is less than or equal to 0.3, the sample value may be set to '0'. Further, for the remaining temporal intervals, in which the IoU value is less than or equal to 0.7 and is greater than 0.3, the IoU values may be used as sample values for the corresponding temporal intervals without change.

The memory 930 stores the video and the sentence query.

Further, the memory 930 stores various types of information generated by the apparatus for detecting the moment described by a sentence query in a video according to the embodiment of the present invention, as described above.

In accordance with an embodiment, the memory 930 may be configured independently of the apparatus for detecting the moment described by a sentence query in a video to support functions for detecting the moment described by a sentence query in a video. Here, the memory 930 may function as separate mass storage, or may include a control function for performing operations.

Meanwhile, the apparatus for detecting the moment described by a sentence query in a video may include memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

By means of such an apparatus for detecting the moment described by a sentence query in a video, the content of a video and a sentence query may be understood, and the temporal interval of the moment that best matches the meaning contained in the sentence query may be retrieved from the video.

Further, a video may be understood from the semantic aspect of a sentence query, and a relation extraction module for emphasizing only visual information related to the sentence query may be presented.

Furthermore, proposal probabilities may be calculated for combinations of all temporal intervals that can be generated in a video and the temporal interval having the highest proposal probability, among the proposal probabilities, may be acquired as a temporal interval in which the contents of the video and the sentence query best match each other.

Furthermore, respective features of a video and a sentence query may be independently extracted, and more diverse and more complicated actions may be detected using a scheme for understanding contextual information of the video in association with the sentence query.

In addition, not only static information of a video, that is, pieces of appearance information that can be independently acquired at each moment, but also dynamic information may be learned, and thus a complicated action such as an action subsequent to or previous to a specific action may be searched for.

Figure 10:
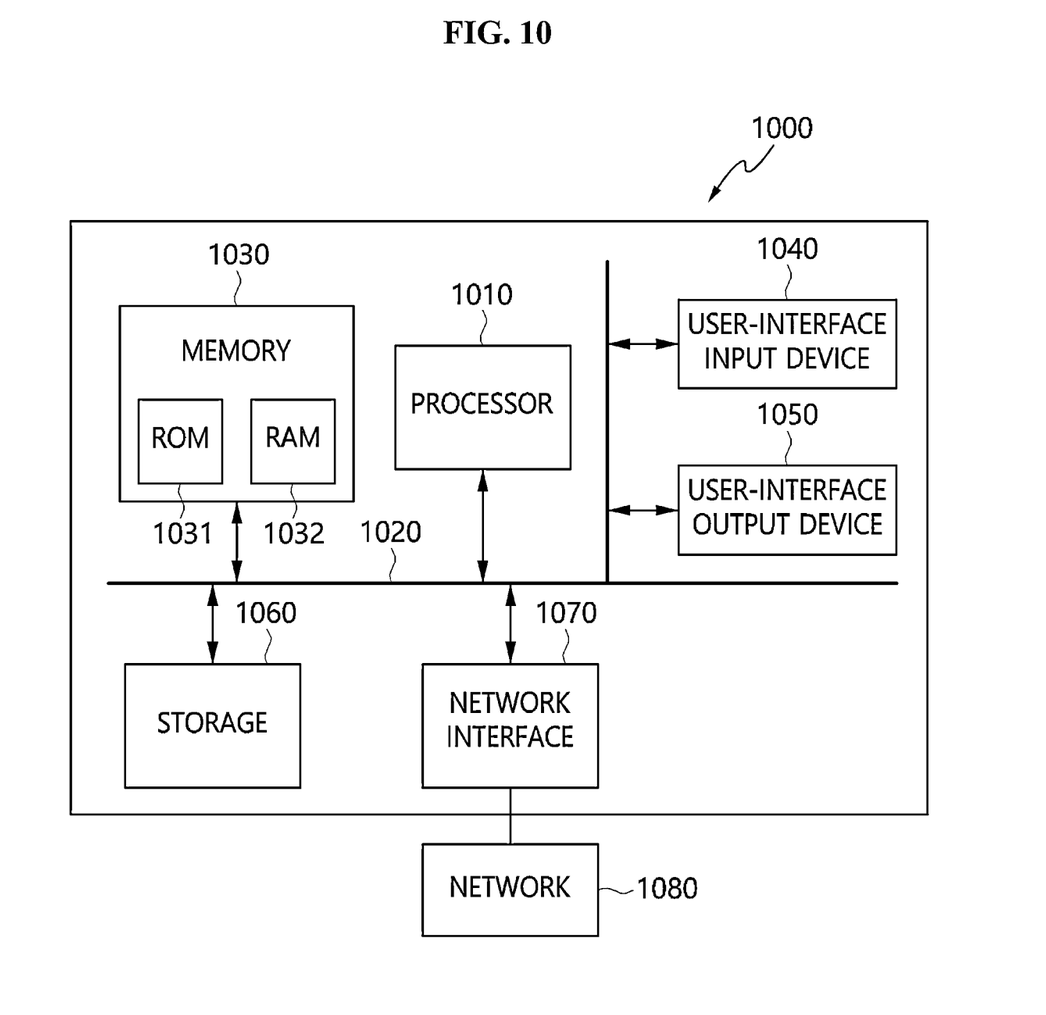
FIG. 10 is a block diagram illustrating a computer system according to an embodiment of the present invention.

FIG. 10 is a diagram illustrating a computer system according to an embodiment of the present invention.

Referring to FIG. 10, the embodiment of the present invention may be implemented in a computer system, such as a computer-readable storage medium. As illustrated in FIG. 10, a computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing processing instructions stored in the memory 1030 or the storage 1060. Each of the memory 1030 and the storage 1060 may be any of various types of volatile or nonvolatile storage media. For example, the memory 1030 may include Read-Only Memory (ROM) 1031 or Random Access Memory (RAM) 1032.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

In accordance with the present invention, the content of a video and a sentence query may be understood, and the temporal interval of the moment that best matches the meaning contained in the sentence query may be retrieved from the video.

Further, the present invention may understand a video from the semantic aspect of a sentence query, and may present a relation extraction module for emphasizing only visual information related to the sentence query.

Furthermore, the present invention may calculate proposal probabilities for combinations of all temporal intervals that can be generated in a video, and may acquire the temporal interval having the highest proposal probability, among the proposal probabilities, as a temporal interval in which the contents of the video and the sentence query best match each other.

Furthermore, the present invention may independently extract respective features of a video and a sentence query, and may detect more diverse and more complicated actions using a scheme for understanding contextual information of the video in association with the sentence query.

In addition, the present invention may learn not only static information of a video, that is, pieces of appearance information that can be independently acquired at each moment, but also dynamic information, thus searching for a complicated action such as an action subsequent to or previous to a specific action.

As described above, in the apparatus for detecting the moment described by a sentence query in a video and the method using the apparatus according to the present invention, the configurations and schemes in the above-described embodiments are not limitedly applied, and some or all of the above embodiments can be selectively combined and configured such that various modifications are possible.

What is claimed is:

1. A method for detecting a moment described by a sentence query in a video and including a memory for storing an input video and an input sentence query and a processor that executes instructions stored in the memory, the method comprising:
   performing, by the processor, supervised learning in a neural network model using learning samples;
   dividing, by the processor, the input video into units of chunks and generating a chunk-level feature sequence based on features that are extracted in a form of vectors from respective chunks;
   dividing, by the processor, the input sentence query into units of words and generating a sentence-level feature sequence based on features that are extracted in a form of vectors from respective words;
   generating, by the processor, a chunk-sentence relation feature sequence including contextual information of the video by extracting a relation between the chunk-level feature sequence and the sentence-level feature sequence;

estimating, by the processor, a temporal interval corresponding to the sentence query in the video based on the chunk-sentence relation feature sequence;

generating, by the processor, a proposal probability map for target contextual information related to the sentence-level feature sequence; and detecting, by the processor, a temporal interval having a highest probability in the proposal probability map as the temporal interval corresponding to the sentence query in the video, wherein the chunk-sentence relation feature sequence corresponds to one piece of information generated by integrating two pieces of information corresponding to interrelated chunk-level features and sentence feature vectors, the proposal probability map is generated by combining a local proposal probability map and a global proposal probability map, the local proposal probability map is generated by independently calculating probabilities that, for respective chunks, a corresponding chunk will be a start point, end point, and middle point of the temporal interval corresponding to the sentence query, based on the chunk-sentence relation feature sequence, and the global proposal probability map is generated by directly exploiting the chunk-sentence relation feature sequence.

2. The method of claim 1, wherein generating the chunk-sentence relation feature sequence comprises:

extracting pieces of target feature information related to the sentence-level feature sequence for respective time points from the chunk-level feature sequence; and sequentially combining the pieces of target feature information with each other depending on the time points, thus extracting overall contextual information of the video.

3. The method of claim 2, wherein estimating the temporal interval is configured to estimate a temporal interval corresponding to target contextual information related to the sentence-level feature sequence, among all temporal intervals of the video, to be the temporal interval corresponding to the sentence query based on the overall contextual information of the video.

4. The method of claim 1, wherein generating the chunk-level feature sequence is configured to extract RGB frames or flow frames corresponding to respective chunks from the video and to sequentially extract video features from respective chunks based on the RGB frames or flow frames, thus generating the chunk-level feature sequence.

5. The method of claim 1, wherein generating the sentence-level feature sequence is configured to generate a sentence-level feature sequence corresponding to semantics of the sentence query by sequentially inputting word vectors extracted from respective words to a recurrent neural network.

6. An apparatus for detecting a moment described by a sentence query in a video, comprising:

a processor for dividing an input video into units of chunks, generating a chunk-level feature sequence based on features that are extracted in a form of vectors from respective chunks, dividing an input sentence query into units of words, generating a sentence-level feature sequence based on features that are extracted in a form of vectors from respective words, generating a chunk-sentence relation feature sequence including contextual information of the video by extracting a relation between the chunk-level feature sequence and the sentence-level feature sequence, and estimating a temporal interval corresponding to the sentence query in the video based on the chunk-sentence relation feature sequence; and a memory for storing the video and the sentence query, wherein the processor performs supervised learning in a neural network model using learning samples, wherein the processor generates a proposal probability map for target contextual information related to the sentence-level feature sequence, wherein the processor detects a temporal interval having a highest probability in the proposal probability map as the temporal interval corresponding to the sentence query in the video, wherein the chunk-sentence relation feature sequence corresponds to one piece of information generated by integrating two pieces of information corresponding to interrelated chunk-level features and sentence feature vectors, wherein the proposal probability map is generated by combining a local proposal probability map and a global proposal probability map, wherein the local proposal probability map is generated by independently calculating probabilities that, for respective chunks, a corresponding chunk will be a start point, end point, and middle point of the temporal interval corresponding to the sentence query, based on the chunk-sentence relation feature sequence, and the global proposal probability map is generated by directly exploiting the chunk-sentence relation feature sequence.

7. The apparatus of claim 6, wherein the processor extracts pieces of target feature information related to the sentence-level feature sequence for respective time points from the chunk-level feature sequence, and sequentially combines the pieces of target feature information with each other depending on the time points, thus extracting overall contextual information of the video.

8. The apparatus of claim 7, wherein the processor estimates a temporal interval corresponding to target contextual information related to the sentence-level feature sequence, among all temporal intervals of the video, to be the temporal interval corresponding to the sentence query based on the overall contextual information of the video.

9. The apparatus of claim 6, wherein the processor extracts RGB frames or flow frames corresponding to respective chunks from the video and sequentially extracts video features from respective chunks based on the RGB frames or flow frames, thus generating the chunk-level feature sequence.

10. The apparatus of claim 6, wherein the processor generates a sentence-level feature sequence corresponding to semantics of the sentence query by sequentially inputting word vectors extracted from respective words to a recurrent neural network.

* * * * *